(12) United States Patent
Saleh et al.

(10) Patent No.: US 12,168,616 B2
(45) Date of Patent: Dec. 17, 2024

(54) SILICON COMPOSITIONS AND METHODS OF PREPARING THE SAME

(71) Applicants: Saudi Arabian Oil Company, Dhahran (SA); King Fahd University of Petroleum & Minerals, Dhahran (SA)

(72) Inventors: Tawfik A. Saleh, Dhahran (SA); Elaf A. Ahmed, Dhahran (SA); Hasan Al Abdulgader, Dammam (SA)

(73) Assignees: Saudi Arabian Oil Company, Dhahran (SA); King Fahd University of Petroleum & Minerals

(*) Notice: Subject to any disclaimer, the term of this patent is extended or adjusted under 35 U.S.C. 154(b) by 448 days.

(21) Appl. No.: 17/560,698

(22) Filed: Dec. 23, 2021

(65) Prior Publication Data

US 2023/0202875 A1 Jun. 29, 2023

(51) Int. Cl.
*C02F 1/28* (2023.01)
*C07F 7/04* (2006.01)
*B82Y 40/00* (2011.01)
*C02F 103/10* (2006.01)

(52) U.S. Cl.
CPC ............... *C02F 1/285* (2013.01); *C07F 7/04* (2013.01); *B82Y 40/00* (2013.01); *C02F 2103/10* (2013.01)

(58) Field of Classification Search
CPC ........ C02F 1/285; C02F 2103/10; C07C 7/04; B82Y 40/00
See application file for complete search history.

(56) References Cited

U.S. PATENT DOCUMENTS

| 10,053,613 B1 | 8/2018 | Kalgaonkar et al. |
| 10,131,556 B1 * | 11/2018 | Atta ............... B01J 20/3295 |
| 2020/0197878 A1 * | 6/2020 | Laoui ............... B01D 71/421 |

FOREIGN PATENT DOCUMENTS

| CN | 105968254 | | 9/2016 | |
| CN | 105968254 A | * | 9/2016 | ............ C08F 220/18 |
| CN | 107876033 | | 4/2018 | |
| CN | 107876033 A | * | 4/2018 | ............ B01J 20/28 |
| CN | 108503858 | | 11/2020 | |
| CN | 108752988 | | 11/2020 | |
| CN | 108752988 B | * | 11/2020 | ............ C08J 7/06 |
| KR | 20210036117 | | 4/2021 | |
| KR | 20210036117 A | * | 4/2021 | ............ D06M 11/79 |
| WO | WO-2018005595 A1 | * | 1/2018 | ............ B01D 61/14 |

OTHER PUBLICATIONS

Hu et al. (Superhydrophobic Surface Fabricated from Fatty Acid-Modified Precipitated Calcium Carbonate, Ind. Eng. Chem. Res. 2010, 49, 5625-5630) (Year: 2010).*
CN-108752988-B_English (Year: 2020).*
KR-20210036117A_English (Year: 2021).*
CN-105968254-A_English (Year: 2016).*
CN-107876033-A_English (Year: 2018).*
Adebajo et al., "Porous materials for oil spill cleanup: a review of synthesis and absorbing properties." Journal of Porous materials 10.3, Sep. 2003, 159-170, 32 pages.

(Continued)

*Primary Examiner* — Youngsul Jeong
(74) *Attorney, Agent, or Firm* — Fish & Richardson P.C.

(57) ABSTRACT

Provided herein are compositions comprising a plurality of nanoparticles and methods of preparing the same.

20 Claims, 3 Drawing Sheets (56) References Cited

OTHER PUBLICATIONS

Anju et al., "Magnetically actuated graphene coated polyurethane foam as potential sorbent for oils and organics." Arabian Journal of Chemistry 13.1, Jan. 2020, 1752-1762, 11 pages.
Atta et al., "Novel superhydrophobic sand and polyurethane sponge coated with silica/modified asphaltene nanoparticles for rapid oil spill cleanup." Nanomaterials 9.2, Feb. 2019, 187, 14 pages.
Azarshin et al., "Surface functionalization of silica nanoparticles to improve the performance of water flooding in oil wet reservoirs." Energy Exploration & Exploitation 35.6, Nov. 2017, 685-697, 13 pages.
Bano et al., "Durable and recyclable superhydrophobic fabric and mesh for oil-water separation." Advanced Engineering Materials 20.1, Jan. 2018, 9 pages.
Calcagnile et al., "Magnetically driven floating foams for the removal of oil contaminants from water." ACS nano 6.6, Jun. 2012, 5413-5419, 7 pages.
Cong et al., "Macroscopic multifunctional graphene-based hydrogels and aerogels by a metal ion induced self-assembly process." ACS nano 6.3, Mar. 2012, 2693-2703, 11 pages.
Deschamps et al., "Oil removal from water by selective sorption on hydrophobic cotton fibers. 1. Study of sorption properties and comparison with other cotton fiber-based sorbents." Environmental science & technology 37.5, Mar. 2003, 1013-1015, 3 pages.
Dong et al., "Superhydrophobic and superoleophilic hybrid foam of graphene and carbon nanotube for selective removal of oils or organic solvents from the surface of water." Chemical communications 48.86, 2012, 10660-10662, 3 pages.
Feng et al., "A super-hydrophobic and super-oleophilic coating mesh film for the separation of oil and water." Angewandte Chemie 116.Apr. 15, 2004, 2046-2048, 3 pages.
Fuertes et al., "Adsorption of volatile organic compounds by means of activated carbon fibre-based monoliths." Carbon 41.1, Jan. 2003, 87-96, 10 pages.
Gao et al., "Engineered graphite oxide materials for application in water purification." ACS applied materials & interfaces 3.6, Jun. 2011, 1821-1826, 6 pages.
Ge et al., "A superhydrophobic monolithic material with tunable wettability for oil and water separation" J Mater Sci, 50, Mar. 2015, 2365-2369, 5 pages.
Gui et al., "Carbon nanotube sponges." Advanced materials 22.5, Feb. 2010, 617-621, 5 pages.
Guo et al., "Carbon nanofiber based superhydrophobic foam composite for high performance oil/water separation." Journal of Hazardous Materials 402, Jan. 2021, 10 pages.
Hu et al., "Compressible carbon nanotube-graphene hybrid aerogels with superhydrophobicity and superoleophilicity for oil sorption." Environmental Science & Technology Letters 1.3, Mar. 2014, 214-220, 7 pages.
Hu et al., "Polymer/graphene hybrid aerogel with high compressibility, conductivity, and "sticky" superhydrophobicity." ACS applied materials & interfaces 6.5, Mar. 2014, 3242-3249, 8 pages.
Hu et al., "Ultralight and highly compressible graphene aerogels." Advanced materials 25.15, Apr. 2013, 2219-2223, 5 pages.
Jiang et al., "Facile preparation of superhydrophobic and superoleophilic sponge for fast removal of oils from water surface." Journal of Materials Research 28.4, Feb. 2013, 651-656, 6 pages.
Kwon et al., "On-demand separation of oil-water mixtures." Advanced materials 24.27, Jul. 2012, 3666-367, 6 pages.
Li et al., "A facile approach to superhydrophobic and superoleophilic graphene/polymer aerogels." Journal of Materials Chemistry A 2.9, 2014, 3057-3064, 8 pages.
Liu et al., "Facile fabrication of a robust and corrosion resistant superhydrophobic aluminum alloy surface by a novel method." RSC Advances 4.98, 2014, 55556-55564, 25 pages.
Malik et al., "Marvelous oleophillic adsorption ability of SiO2/activated carbon and GO composite nanostructure using polyurethane for rapid oil spill cleanup" Applied Nanoscience 11.4, Apr. 2021, 1211-1223, 13 pages.
Nguyen et al., "Superhydrophobic and superoleophilic properties of graphene-based sponges fabricated using a facile dip coating method." Energy & environmental science 5.7, 2012, 7908-7912, 5 pages.
Park et al., "Hydrophobic polydimethylsiloxane (PDMS) coating of mesoporous silica and its use as a preconcentrating agent of gas analytes." Langmuir 30.34, Sep. 2014, 10256-10262, 7 pages.
Protsak et al., "A new route for preparation of hydrophobic silica nanoparticles using a mixture of poly (dimethylsiloxane) and diethyl carbonate." Polymers 10.2, Feb. 2018, 13 pages.
Sharma et al., "Controlled oxygen functional groups on reduced graphene using rate of temperature for advanced sorption process." Journal of Environmental Chemical Engineering 8.3, Jun. 2020, 10 pages.
Sun et al., "Superhydrophobic activated carbon-coated sponges for separation and absorption." ChemSusChem 6.6, Jun. 2013, 1057-1062, 7 pages.
Tao et al., "Facile synthesis of highly graphitized porous carbon monoliths with a balance on crystallization and pore-structure." Journal of Materials Chemistry A 2.32, 2014, 12785-12791, 8 pages.
Wu et al., "Mechanically flexible and multifunctional polymer-based graphene foams for elastic conductors and oil-water separators." Advanced Materials 25.39, Oct. 2013, 5658-5662, 5 pages.
Xiao et al. "Synthesis and structure of carbon belts made of carbon nanofibers supported on carbon foams." Carbon 61, Sep. 2013, 386-394, 9 pages.
Xiao et al., "Synthesis of a carbon nanofiber/carbon foam composite from coal liquefaction residue for the separation of oil and water." Carbon 59, Aug. 2013, 530-536, 7 pages.
Yazidi et al., "Adsorption of amoxicillin and tetracycline on activated carbon prepared from durian shell in single and binary systems: Experimental study and modeling analysis." Chemical Engineering Journal 379, Jan. 2020, 7 pages.
Zhu et al., "Facile removal and collection of oils from water surfaces through superhydrophobic and superoleophilic sponges." The Journal of Physical Chemistry C 115.35, Sep. 2011, 17464-17470, 7 pages.
Zulfiqar et al., "In-situ synthesis of bi-modal hydrophobic silica nanoparticles for oil-water separation." Colloids and Surfaces A: Physicochemical and Engineering Aspects 508, Nov. 2016, 301-308, 8 pages.
Fallah et al., "Spray-Deposition of an Organic/Inorganic Blend for Fabrication of a Superhydrophobic Surface: Effect of Admixing with Silica Aerogel and Modified Silica Nanoparticles," Physicochemical Problems of Materials Protection, Oct. 10, 2018, 54:909-916, 8 pages.
Li et al., "Understanding the mechanisms of silica nanoparticles for nanomedicine," WIREs Nanomed Nanobiotechnology, 2021, 13(1):1-23, 23 pages.
SAIP Examination Report in SAIP Appln. No. 122440915, dated Jul. 2, 2024, 15 pages, with English translation.

* cited by examiner

SILICON COMPOSITIONS AND METHODS OF PREPARING THE SAME

TECHNICAL FIELD

Provided herein are compositions useful for the treatment of produced water and oilfield wastewater. Also provided herein are methods of preparing the compositions as disclosed herein.

BACKGROUND

Produced water or oilfield wastewater is a by-product of oil and gas operations, and its production is increasing. Various absorbents, including active carbon, zeolites, and natural fibers, have been used to remove contaminants from produced water. Active carbon, carbon composites, and graphene-based sponges have also been used for similar purposes.

SUMMARY

Provided herein are compositions useful for the treatment of produced water and oilfield wastewater. Also provided herein are methods of preparing the compositions as disclosed herein. The compositions and methods can allow for relatively low-cost, relatively stable, and/or relatively effective approaches for treating produced water and/or oilfield wastewater, for example, to remove contaminants from such water.

Provided herein are compositions comprising a plurality of nanoparticles, wherein each of the nanoparticles comprises a compound of Formula (I):

$$Si(OH)_n(CO_2R)_m \quad (I)$$

wherein, R is C8-C30 alkyl;
n is 0, 1, 2 or 3;
m is 1, 2, 3, or 4; and,
the sum of n and m is 4.

Also provided are methods of preparing the composition as disclosed herein, wherein the method comprises steps of: a) admixing a base, water, and a tetraalkoxysilane to form orthosilicic acid nanoparticles; and b) admixing the orthosilicic acid nanoparticles and a saturated fatty acid to form the composition.

Also provided herein are methods of treating water comprising admixing the composition as disclosed herein and an oil-water mixture.

In an aspect, the disclosure provides a composition comprising a plurality of nanoparticles. Each of the nanoparticles comprises a compound of the formula $Si(OH)_n(CO_2R)_m$. R is C8-C30 alkyl. n is 0, 1, 2 or 3. m is 1, 2, 3, or 4. The sum of n and m is 4.

Embodiments can include one or more of the following. R is C15-C20 alkyl, such as C17 alkyl. n is 3 and m is 1. n is 0 and m is 4. The plurality of nanoparticles has an average particle size distribution in a range of about 50 nm to about 90 nm, such about 60 nm to about 80 nm. The plurality of nanoparticles has a contact angle in a range of about 140° to about 144°, such as about 154° to about 158°. The composition has a separation efficiency of at least 80 wt % (e.g., at least 90 wt %) in an oil-water mixture, wherein the composition is provided in an amount of about 5 wt % based on the total weight of the oil-water mixture. The oil in the oil-water mixture comprises one or more of hexane, decane, dodecane, diesel oil, carbon tetrachloride, vegetable oil, and ethanol. The composition sustains an absorption capacity of about +5% of the first absorption capacity in an oil-water mixture for at least 5 absorption-desorption cycles. The composition further comprises a substrate, wherein the plurality of nanoparticles are contained in the substrate.

In an aspect, the disclosure provides a method of preparing a composition according to the disclosure. The method comprises admixing a base, water, and a tetraalkoxysilane to form orthosilicic acid nanoparticles, and admixing the orthosilicic acid nanoparticles and a saturated fatty acid to form the composition.

Embodiments can include one or more of the following. The base and water can have a pH in a range of about 9.5 to about 10.5. The saturated fatty acid is a C8-C30 saturated fatty acid. The saturated fatty acid is stearic acid. The orthosilicic acid nanoparticles and the saturated fatty acid are in a molar ratio in a range of about 1:1 to about 1:4.

In an aspect, the disclosure provides a method of treating water comprising admixing the composition of claim 1 and an oil-water mixture.

DETAILED DESCRIPTION

Provided herein are compositions comprising a plurality of nanoparticles and methods of preparing the same.

Embodiments of the compositions disclosed herein can advantageously have one or more of the following properties selected from the group of: (1) high separation efficiency of oil and/or organic solvents from water, e.g., at least 60%, at least 80%, or at least 90% separation efficiency; (2) excellent absorbent reusability, e.g., the compositions of the disclosure herein sustain an absorption capacity of about +5% of the first absorption capacity in an oil-water mixture for at least 3 absorption-desorption cycles or the compositions of the disclosure herein sustain an absorption capacity of about +3% of the first absorption capacity in an oil-water mixture for at least 5 absorption-desorption cycles; (3) swift absorption of oil and/or organic solvents from water, e.g., the compositions as disclosed herein achieve absorption capacity of the oil and/or organic solvents in a range of about 10 seconds to about 15 minutes, or about 30 seconds to 10 minutes, or about 30 seconds to 5 minutes; and, (4) superhydrophobicity, e.g., the nanoparticles as disclosed herein can have a contact angle of at least 130°, or in a range of about 130° to about 180°, or about 135° to about 165°. As used herein, contact angle is determined using contact angle (WCA/OCA) measurement (Attension Theta Optical Tensiometer).

The compositions can be prepared by admixing a base, water, and a tetraalkoxysilane to form orthosilicic acid nanoparticles; and, admixing the orthosilicic acid nanoparticles and an acid to form the composition.

Embodiments of the method of preparing the compositions as disclosed herein can advantageously have one or more of the group of: (1) reduced (e.g., minimal) amount of synthetic steps, e.g., one synthetic step or two synthetic steps; (2) relatively low-cost starting materials; and (3) relatively high atom economy.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The use of the terms "a," "an," "the," and similar referents in the context of the disclosure herein (especially in the context of the claims) are to be construed to cover both the singular and the plural, unless otherwise indicated. Recitation of ranges of values herein merely are intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended to better illustrate the disclosure herein and is not a limitation on the scope of the disclosure herein unless otherwise indicated. No language in the specification should be construed as indicating any non-claimed element as essential to the practice of the disclosure herein.

Compositions

The disclosure provides compositions comprising a plurality of nanoparticles. In embodiments, each of the nanoparticles comprises a compound of Formula (I):

$$Si(OH)_n(CO_2R)_m \qquad (I)$$

wherein, R is C8-C30 alkyl;
n is 0, 1, 2 or 3;
m is 1, 2, 3, or 4; and,
the sum of n and m is 4.

As used herein, the term "alkyl" refers to straight chained and branched saturated hydrocarbon groups. The term Cn means the alkyl group has "n" carbon atoms. For example, C8 alkyl refers to an alkyl group that has 8 carbon atoms. C8-C30 alkyl refers to an alkyl group having a number of carbon atoms encompassing the entire range (i.e., 8 to 30 carbon atoms), as well as all subgroups (e.g., 8-28, 8-24, 10-30, 10-20 carbon atoms). Non-limiting examples of alkyl groups include, octyl, nonyl, decyl, undecyl, dodecyl, tridecyl, tetradecyl, pentadecyl, hexadecyl, heptadecyl, octadecyl, nonadecyl, and icosyl. Unless otherwise indicated, an alkyl group can be an unsubstituted alkyl group or a substituted alkyl group. The alkyl group can be substituted with 1-10 substituents selected from the group of: halogens (e.g., F, Cl, Br, or I), C1-C6 alkyl, and C3-C6 cycloalkyl.

As used herein, the term "cycloalkyl" refers to an aliphatic cyclic hydrocarbon group that is monocyclic or polycyclic (e.g., bridged, fused, or spiro). The term Cn means the cycloalkyl group has "n" carbon atoms. For example, C5 cycloalkyl refers to a cycloalkyl group that has 5 carbon atoms in the ring. C3-C6 cycloalkyl refers to cycloalkyl groups having a number of carbon atoms encompassing the entire range (i.e., 3 to 6 carbon atoms), as well as all subgroups (e.g., 3-5, 4-6, 5-6, 3, 4, 5, and 6 carbon atoms). Nonlimiting examples of cycloalkyl groups include cyclopropyl, cyclobutyl, cyclopentyl, and cyclohexyl.

In embodiments, R is C8-C30. In embodiments, R is C8-28 alkyl. In embodiments, R is C9-C30 alkyl. In embodiments, R is C11-C30 alkyl. In embodiments, R is C11-C25 alkyl. In embodiments, R is C11-C21 alkyl. In embodiments, R is C11-C21 alkyl. In embodiments, R is C11-C19 alkyl. In embodiments, R is C13-C23 alkyl. In embodiments, R is C15-C25 alkyl. In embodiments, R is C16-C21 alkyl. In embodiments, R is C15-C19 alkyl. In embodiments, R is selected from the group of: C11 alkyl, C13 alkyl, C15 alkyl, C17 alkyl, and C19 alkyl. In embodiments, R is C11 alkyl. In embodiments, R is C13 alkyl. In embodiments, R is C15 alkyl. In embodiments, R is C17 alkyl.

In embodiments, n is 0, 1, 2, or 3. In embodiments, n is 0 or 3. In embodiments, n is 0. In embodiments, n is 1. In embodiments, n is 2. In embodiments, n is 3.

In embodiments, m is 1, 2, 3, or 4. In embodiments, m is 1 or 4. In embodiments, m is 1. In embodiments, m is 2. In embodiments, m is 3. In embodiments, m is 4.

In embodiments, n is 3, m is 1, and R is C11-C19 alkyl. In embodiments, n is 3, m is 1, and R is C13-C19 alkyl. In embodiments, n is 3, m is 1, and R is C15-C19 alkyl. In embodiments, n is 3, m is 1, and R is C17 alkyl.

In embodiments, n is 0, m is 4, and R is C11-C19 alkyl. In embodiments, n is 0, m is 4, and R is C13-C19 alkyl. In embodiments, n is 0, m is 4, and R is C15-C19 alkyl. In embodiments, n is 0, m is 4, and R is C17 alkyl.

In embodiments, the plurality of nanoparticles has an average particle size distribution in a range of about 50 nm to 90 nm (e.g., about 60 nm to 80 nm, about 65 nm to 75 nm, about 70 nm).

In embodiments, the plurality of nanoparticles has a contact angle of at least 130°. In embodiments, the plurality of nanoparticles has a contact angle in a range of about 130° to about 180°, or about 140° to about 160°. In embodiments, the plurality of nanoparticles has a contact angle in a range of about 140° to about 150°. In embodiments, the plurality of nanoparticles has a contact angle in a range of about 140° to about 144°. In embodiments, the plurality of nanoparticles has a contact angle of about 142°. In embodiments, the plurality of nanoparticles has a contact angle in a range of about 150° to about 160°. In embodiments, the plurality of nanoparticles has a contact angle in a range of about 154° to about 158°. In embodiments, the plurality of nanoparticles has a contact angle of 156°.

In embodiments, the composition further comprises a substrate. In embodiments, the plurality of nanoparticles are contained in the substrate. Examples of substrates include membranes and foams. In embodiments, the substrate comprises a membrane. In embodiments, the substrate is a membrane. In embodiments, the membrane comprises a polypropylene or polyether sulfone. In embodiments, a membrane page (a polymer membrane packed with the material used for oil-water separation), such as a polypropylene membrane page, is used. In embodiments, the plurality of nanoparticles are embedded in the substrate.

The plurality of nanoparticles can be provided in an amount in a range of about 0.1 wt % to about 50 wt %, based on the total weight of the composition. In embodiments, the plurality of nanoparticles are provided in an amount in a range of about 1 wt % to about 40 wt %, or about 1 wt % to about 30 wt %, or about 1 wt % to about 20 wt %, or about 1 wt % to about 10 wt %, based on the total weight of the composition. For example, the plurality of nanoparticles are provided in an amount of about 1 wt %, 2 wt %, 3 wt %, 4 wt %, 5 wt %, 6 wt %, 7 wt % 8 wt %, 9 wt %, 10 wt %, 15 wt %, 20 wt %, 30 wt %, 40 wt %, or 50 wt %.

In embodiments, the composition has a separation efficiency of at least 60 wt % in an oil-water mixture, wherein composition is provided in an amount of about 5 wt % based on the total weight of the oil-water mixture. In embodiments, the composition has a separation efficiency of at least 65 wt % in an oil-water mixture, wherein composition is provided in an amount of about 5 wt % based on the total weight of the oil-water mixture. In embodiments, the composition has a separation efficiency of at least 70 wt % in an oil-water mixture, wherein composition is provided in an amount of about 5 wt % based on the total weight of the oil-water mixture. In embodiments, the composition has a separation efficiency of at least 75 wt % in an oil-water mixture, wherein composition is provided in an amount of about 5 wt % based on the total weight of the oil-water mixture. In embodiments, the composition has a separation efficiency of at least 80 wt % in an oil-water mixture, wherein composition is provided in an amount of about 5 wt % based on the total weight of the oil-water mixture. In embodiments, the composition has a separation efficiency of at least 85 wt % in an oil-water mixture, wherein composition is provided in an amount of about 5 wt % based on the total weight of the oil-water mixture. In embodiments, the composition has a separation efficiency of at least 90 wt % in an oil-water mixture, wherein composition is provided in an amount of about 5 wt % based on the total weight of the oil-water mixture. In embodiments, the composition has a separation efficiency of at least 95 wt % in an oil-water mixture, wherein composition is provided in an amount of about 5 wt % based on the total weight of the oil-water mixture. In embodiments, the composition has a separation efficiency of at least 98 wt % in an oil-water mixture, wherein composition is provided in an amount of about 5 wt % based on the total weight of the oil-water mixture. In embodiments, the composition has a separation efficiency of at least 99 wt % in an oil-water mixture, wherein composition is provided in an amount of about 5 wt % based on the total weight of the oil-water mixture. In embodiments, the composition has a separation efficiency of at least 99.9 wt % in an oil-water mixture, wherein composition is provided in an amount of about 5 wt % based on the total weight of the oil-water mixture. In embodiments, the composition absorbs oil from the oil-water mixture at room temperature.

The separation efficiency as disclosed herein is calculated using equation I:

$$\text{Separation efficiency (\%)} = \frac{m_r}{m_0} \times 100 \quad \text{(I)}$$

wherein $m_r$ is the weight of the absorbed oil by the composition and $m_o$ is the initial weight of the oil in the oil-water mixture.

The term "oil-water mixture" as used herein refers to a mixture of oil and water, wherein the oil comprises organic solvents and/or liquid derived from petroleum. In embodiments, the oil comprises one or more of hexane, decane, dodecane, diesel oil, carbon tetrachloride, vegetable oil, and ethanol. In embodiments, the oil comprises one or more of hexane, decane, dodecane, carbon tetrachloride, and ethanol. In embodiments, the oil comprises one or more of diesel oil and vegetable oil.

In embodiments, the composition sustains an absorption capacity of about ±5% of the first absorption capacity in an oil-water mixture for at least 3 absorption-desorption cycles. In embodiments, the composition sustains an absorption capacity of about ±5% of the first absorption capacity in an oil-water mixture for at least 4 absorption-desorption cycles. In embodiments, the composition sustains an absorption capacity of about ±5% of the first absorption capacity in an oil-water mixture for at least 5 absorption-desorption cycles. In embodiments, the composition sustains an absorption capacity of about ±3% of the first absorption capacity in an oil-water mixture for at least 3 absorption-desorption cycles. In embodiments, the composition sustains an absorption capacity of about ±3% of the first absorption capacity in an oil-water mixture for at least 4 absorption-desorption cycles. In embodiments, the composition sustains an absorption capacity of about ±3% of the first absorption capacity in an oil-water mixture for at least 5 absorption-desorption cycles.

The absorption capacity of the composition for various oils as used herein is calculated using equation II:

$$\text{Absorption capacity} = \frac{m_c - m}{m} \quad \text{(II)}$$

wherein $m_c$ is the composition weight after immersion in the oil-water mixture, and m is the composition weight prior to immersion in the oil-water mixture.

In some embodiments, absorption capacity can be determined as follows. The selected oil samples are introduced dropwise into the beaker. Next, the initially weighed SMSi2 is dipped in the oil samples to be completely absorbed. When the saturated foam are taken out of the beaker, its weight was again measured and recorded. Lastly, the saturated sponge was repetitively squeezed to expel most of the absorbed oil. The mean value of each of the sample tested for at least three trials was recorded. The absorption capacity of the absorbent materials or different oils were calculated using equation III.

$$\text{Absorption capacity} = mc - mm \quad \text{(III)}$$

where $m_c$ is the foam weight after immersion in oil in g, and m is the weight of the dry foam in g.

In certain embodiments, cyclic separation efficiency is determined as follows. The efficiency of separation of SMSi2 is determined for different oils. A weighted SMSi2 sample is introduced into an oil-water mixture and allowed to absorb at ambient temperature. The efficiency of separation of the absorbent is calculated using equation IV.

$$\text{Separation efficiency \%} = mrm0 \times 100 \quad \text{(IV)}$$

where mr is the weight of the retrieved oil (or organic solvent) while m0 is the original weight of the oil sample in the mixture. Moreover, the process above is repeated to assess the reusability of the SMSi2 in the absorption test. A total of 5 absorption-desorption experiments is carried out.

Methods of Preparing

Provided herein are methods of preparing the composition as disclosed herein. In embodiments, the method of preparing the composition comprises steps of: a) admixing a base, water, and a tetraalkoxysilane to form orthosilicic acid nanoparticles; and b) admixing the orthosilicic acid nanoparticles and a saturated fatty acid to form the composition as disclosed herein.

As used herein, the term "tetraalkoxysilane" refers to a compound having a formula of: $Si(OR^1)_4$, wherein $R^1$ is C1-C6 alkyl. Non-limiting examples of the tetraalkoxysilane include tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, tetraphenoxysilane, monoethoxytrimethoxysilane, monobutoxytrimethoxysilane. In embodiments, $R^1$ is C1-C4 alkyl. In embodiments, $R^1$ is C1-C2 alkyl. In embodiments, the tetraalkoxysilane is tetramethoxysilane or tetraethoxysilane. In embodiments, the tetraalkoxysilane is tetraethoxysilane.

In embodiments, the base comprises one or more of the group of: $NH_4OH$, KOH and NaOH. In embodiments, the base comprises ammonia. In embodiments, the base is ammonia.

In embodiments, the base and water have a pH in a range of about 9 to about 12. In embodiments, the base and water have a pH in a range of about 9 to about 11. In embodiments, the base and water have a pH in a range of about 9 to about 10. In embodiments, the base and water have a pH in a range of about 9.5 to about 12. In embodiments, the base and water have a pH in a range of about 9.5 to about 11. In embodiments, the base and water have a pH in a range of about 9.5 to about 10.5. In embodiments, the base and water have a pH of about 10.

The admixing of the base, water, and the tetraalkoxysilane can be carried out at a temperature in a range of about −30° C. to about 50° C. In embodiments, the admixing of step a) occurs at a temperature in a range of about −10° C. to about 30° C., for example, in a range of about 0° C. to about 30° C., or about 0° C. to about 25° C., or about 0° C. to about 20° C., or about 5° C. to about 15° C., or about 10° C. In embodiments, the admixing of step a) occurs at a temperature in a range of about 0° C. to about 20° C. In embodiments, the admixing of step a) occurs at a temperature in a range of about 5° C. to about 15° C. In embodiments, the admixing of step a) occurs at a temperature of about 10° C. The admixing of the base, water, and the tetraalkoxysilane can be in a range of about 1 minute to about 12 hours, or about 10 minutes to about 6 hours, or about 30 minutes to about 6 hours, or about 30 minutes to about 4 hours, or about 1 hour to about 3 hours, or about 2 hours. In embodiments, the admixing of step a) occurs for about 30 minutes to about 6 hours. In embodiments, the admixing of step a) occurs for about 2 hours.

In embodiments, prior to admixing the base, water, and the tetraalkoxysilane, the tetraalkoxysilane can be admixed in a solvent at a temperature in a range of about −30° C. to about 5° C. In embodiments, the tetraalkoxysilane is admixed in a solvent at a temperature of about −10° C. to about 5° C. In embodiments, the tetraalkoxysilane is admixed in a solvent at a temperature of about 0° C. In embodiments, the tetraalkoxysilane can be admixed in a solvent for about 1 minute to about 2 hours, or about 10 minutes to about 1 hour, or about 30 minutes. In embodiments, a mixture of the base and water is added drop-wise to the admixture of tetraalkoxysilane and a solvent.

In embodiments, the admixing of step a) and/or step b) comprises a solvent. In embodiments, the solvent comprises a polar protic solvent. Non-limiting examples of the polar protic solvent include methanol, ethanol, isopropanol, butanol, and pentanol. In embodiments, the polar protic solvent comprises one or more of methanol, ethanol, isopropanol, and butanol. In embodiments, the polar protic solvent is ethanol. In embodiments, the admixing of step a) and/or step b) comprises ethanol. In embodiments, the admixing of step a) and step b) comprises ethanol.

As used herein, the term "saturated fatty acid" refers to a carboxylic acid composed of a linear or branched hydrocarbon chain having a carboxylic acid group at the end. In general, saturated fatty acids can have 8 to 30 carbon atoms, i.e., a C8-C30 saturated fatty acid. Non-limiting examples of saturated fatty acids include lauric acid, myristic acid, palmitic acid, and stearic acid. In embodiments, the saturated fatty acid is a C8-C30 saturated fatty acid. In embodiments, the saturated fatty acid comprises one or more of lauric acid, myristic acid, palmitic acid, and stearic acid. In embodiments, the saturated fatty acid is one or more of lauric acid, myristic acid, palmitic acid, or stearic acid. In embodiments, the saturated fatty acid is stearic acid.

In embodiments, the admixing of step b) comprises the orthosilicic acid nanoparticles and the saturated fatty acid in a molar ratio in a range of about 1.2:1 to about 1:10, respectively. In embodiments, the orthosilicic acid nanoparticles and the saturated fatty acid are in a molar ratio in a range of about 1.2:1 to about 1:8, or about 1.2:1 to about 1:5, or about 1.2:1 to about 1:4.5, or about 1:1 to about 1:4.5, or about 1:1 to about 4:4, respectively. For example, the orthosilicic acid nanoparticles and the saturated fatty acid are in a molar ratio of about 1.2:1, about 1:1, about 1:1.2, about 1:1.5, about 1:2, about 1:2.5, about 1:3, about 1:4, about 1:5 or about 1:6. In embodiments, the orthosilicic acid nanoparticles and the saturated fatty acid are in a molar ratio in a range of about 1:1 to about 1:1.2, respectively. In embodiments, the orthosilicic acid nanoparticles and the saturated fatty acid are in a molar ratio of about 1:1, respectively. In embodiments, the orthosilicic acid nanoparticles and the saturated fatty acid are in a molar ratio in a range of about 1:4 to about 1:4.2, respectively. In embodiments, the orthosilicic acid nanoparticles and the saturated fatty acid are in a molar ratio of about 1:4, respectively.

The admixing of the orthosilicic acid nanoparticles and the saturated fatty acid can be carried out at a temperature in a range of about 30° C. to about 130° C. In embodiments, the admixing of step b) occurs at a temperature in a range of about 50° C. to about 130° C., about 40° C. to about 120° C., for example, in a range of about 50° C. to about 100° C., or about 50° C. to about 80° C., or about 60° C. to about 80° C., or about 65° C. to about 75° C., or about 70° C. In embodiments, the admixing of step b) occurs at a temperature in a range of about 60° C. to about 80° C. In embodiments, the admixing of step b) occurs at a temperature in a range of about 65° C. to about 75° C. In embodiments, the admixing of step b) occurs at a temperature of about 70° C. The admixing of the orthosilicic acid nanoparticles and the saturated fatty acid can occur in a range of about 1 minute to about 48 hours. In embodiments, the admixing of step b) occurs for in a range of about 1 hour to about 24 hours, or about 1 hour to about 12 hours, or about 5 hours to about 15 hours, or about 6 hours to about 12 hours, or about 8 hours, or about 12 hours. In embodiments, the admixing of step b)

occurs for about 5 hours to about 15 hours. In embodiments, the admixing of step a) occurs for about 12 hours.

Water Treatment

Also provided herein are methods of treating water comprising admixing the composition as disclosed herein and an oil-water mixture. The admixing can occur at any temperature suitable to one of ordinary skill in the art. In embodiments, the admixing occurs at ambient temperature. In embodiments, the admixing occurs for in a range of about 1 minute to about 2 hours, or about 5 minutes to about 1 hour, or about 5 minutes to about 30 minutes. In embodiments, the oil of the oil-water mixture comprises one or more of hexane, decane, dodecane, diesel oil, carbon tetrachloride, vegetable oil, and ethanol. In embodiments, the oil comprises one or more of hexane, decane, dodecane, carbon tetrachloride, and ethanol. In embodiments, the oil comprises one or more of diesel oil and vegetable oil. In embodiments, the oil-water mixture is oilfield wastewater. In embodiments, the oil-water mixture is produced water. As used herein, "produced water" is defined as a mixture of oil and water that is a byproduct of the extraction of oil and/or natural gas.

In embodiments, the method further comprises recovering oil from the admixture of the composition and the oil-water mixture. In embodiments, recovering the oil comprises separating the composition from the oil-water mixture and applying pressure to the composition such that the oil absorbed by the composition is expelled from the composition.

In the following examples, analysis of oil was performed using gas chromatography.

EXAMPLES

Example 1: Synthesis of Stearate Modified Silica Nanoparticles (SMSi1)

To a solution of 100 mL of ethanol cooled in an ice bath to a temperature of 0° C. was added 30 mL of tetraethyleneorthosilicate (TEOS) to form a TEOS mixture. The TEOS mixture was stirred for 30 min. A solution of ammonium hydroxide and water (pH 10.0) was added drop-wise into the TEOS mixture. The mixture was stirred at 10° C. for 2 h and cooled to room temperature to form silica sol nanoparticles upon aging. To the silica sol nanoparticles, ethanol, ammonium hydroxide, and water was added stearic acid (octadecanoic acid, C18H36O2) dissolved in ethanol at a molar ratio of 1:3, respectively, wherein the stearic acid was added in a 1:1 molar ratio stearic acid to TEOS. The reaction mixture was stirred and refluxed for 12 h at 70° C., and then then cooled to room temperature, forming the stearate modified silica nanoparticles (SMSi1). After cooling, the product was purified by separation. The contact angle of the stearate modified silica nanoparticles was 142°. H$^+$ shows that HNO$_3$ was present, although a different acid (e.g., HCl) could have been used.

Example 2: Synthesis of Stearate Modified Silica Nanoparticles (SMSi2)

To a solution of 100 mL of ethanol cooled in an ice bath to a temperature of 0° C. was added 30 mL of tetraethyleneorthosilicate (TEOS) to form a TEOS mixture. The TEOS mixture was stirred for 30 min. A solution of ammonium hydroxide and water (pH 10.0) was added drop-wise into the TEOS mixture. The mixture was stirred at 10° C. for 2 h and cooled to room temperature to form silica sol nanoparticles upon aging. To the silica sol nanoparticles, ethanol, ammonium hydroxide, and water was added stearic acid (octadecanoic acid, C18H36O2) dissolved in ethanol at a molar ratio of 1:3, respectively, wherein the stearic acid was added in a 4:1 molar ratio stearic acid to TEOS. The reaction mixture was stirred and refluxed for 12 h at 70° C., and then then cooled to room temperature, forming the stearate modified silica nanoparticles (SMSi2). The contact angle of the stearate modified silica nanoparticles was 156°.

Example 3: Separation Efficiency of SMSi1 and SMSi2

SMSi1 was packed inside a membrane page to form a SMSi1 membrane and the SMSi1 membrane was weighed for its initial weight. The SMSi1 membrane was dipped into a mixture of oil and water or organic solvent and water at ambient temperature to evaluate the SMSi1 membrane's efficiency to absorb organic solvent or oil in water. The saturated SMSi1 membrane was taken out of the mixture of oil and water or organic solvent and water, and weighed again for its weight after absorption. The SMSi1 membrane was repetitively squeezed to expel the absorbed oil or solvent. The mean value of each of the samples tested of at least three trials was recorded. The efficiency of separation of the SMSi1 membrane was calculated using Equation 1 disclosed herein.

SMSi2 was packed inside a membrane page to form a SMSi2 membrane and the SMSi2 membrane was weighed for its initial weight. The SMSi2 membrane was dipped into a mixture of oil and water or organic solvent and water at ambient temperature to evaluate the SMSi2 membrane's efficiency to absorb organic solvent or oil in water. The saturated SMSi2 membrane was taken out of the mixture of oil and water or organic solvent and water, and weighed again for its weight after absorption. The SMSi2 membrane was repetitively squeezed to expel the absorbed oil or solvent. The mean value of each of the samples tested of at least three trials was recorded. The efficiency of separation of the SMSi1 membrane was calculated using Equation 1 disclosed herein.

Figure 1:
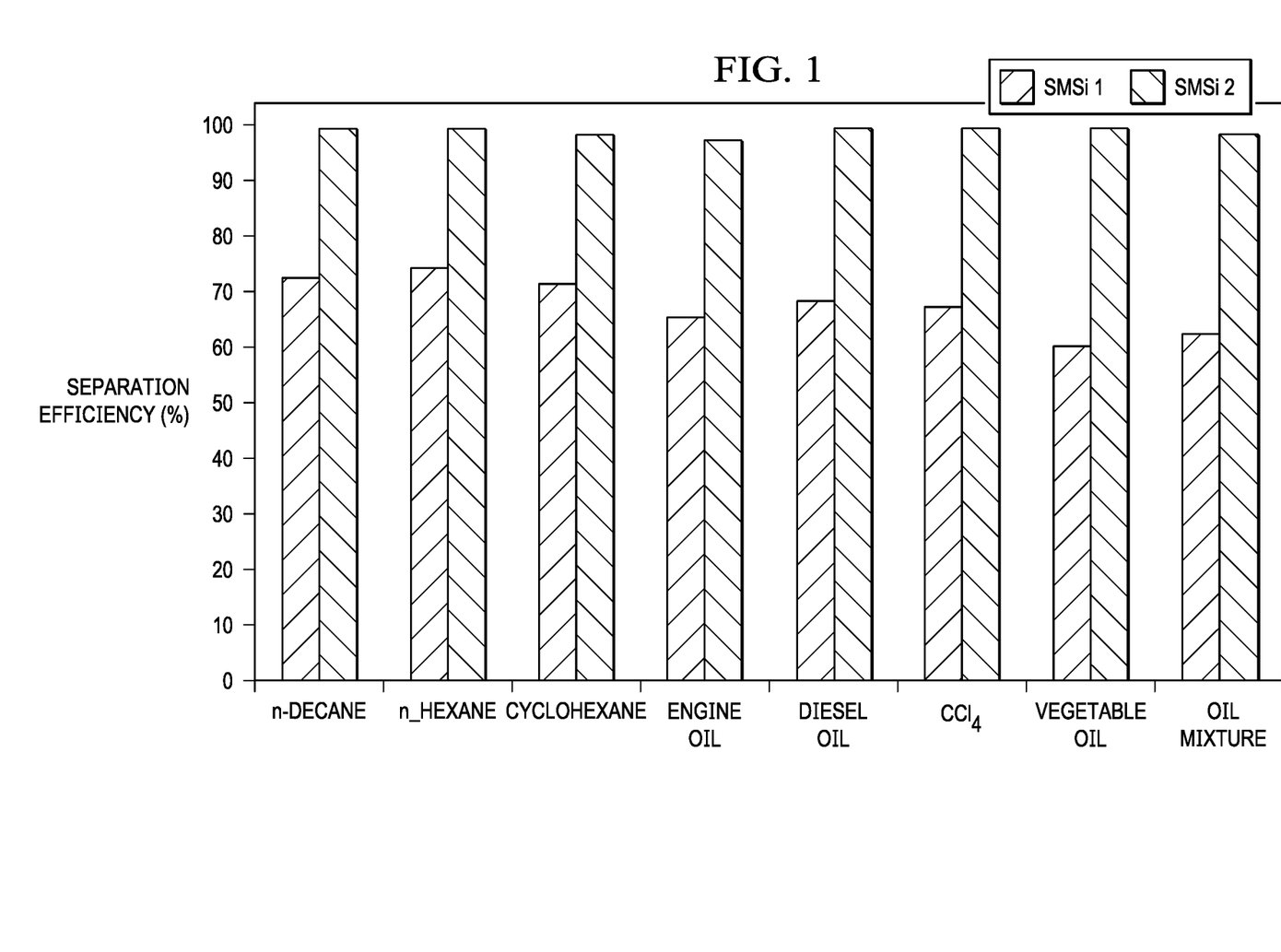
FIG. 1 is a graph of the separation efficiency of compositions as disclosed herein in various oil-water mixtures.

The separation efficiency of both the SMSi1 membrane and SMSi2 membrane is shown in FIG. 1. The SMSi1 membrane and SMSi2 membrane both showed above 50% separation efficiency for all tested solvents and oils. Interestingly, the SMSi2 membrane showed above 95% separation efficiency for all tested solvents and oils and above 99% separation efficiency for most oils and solvents. The oil mixture as shown in FIG. 1, FIG. 2, and FIG. 3 is defined as a mixture of n-decane, n-hexane, cyclohexane, engine oil, diesel oil, carbon tetrachloride, and vegetable oil.

Figure 2:
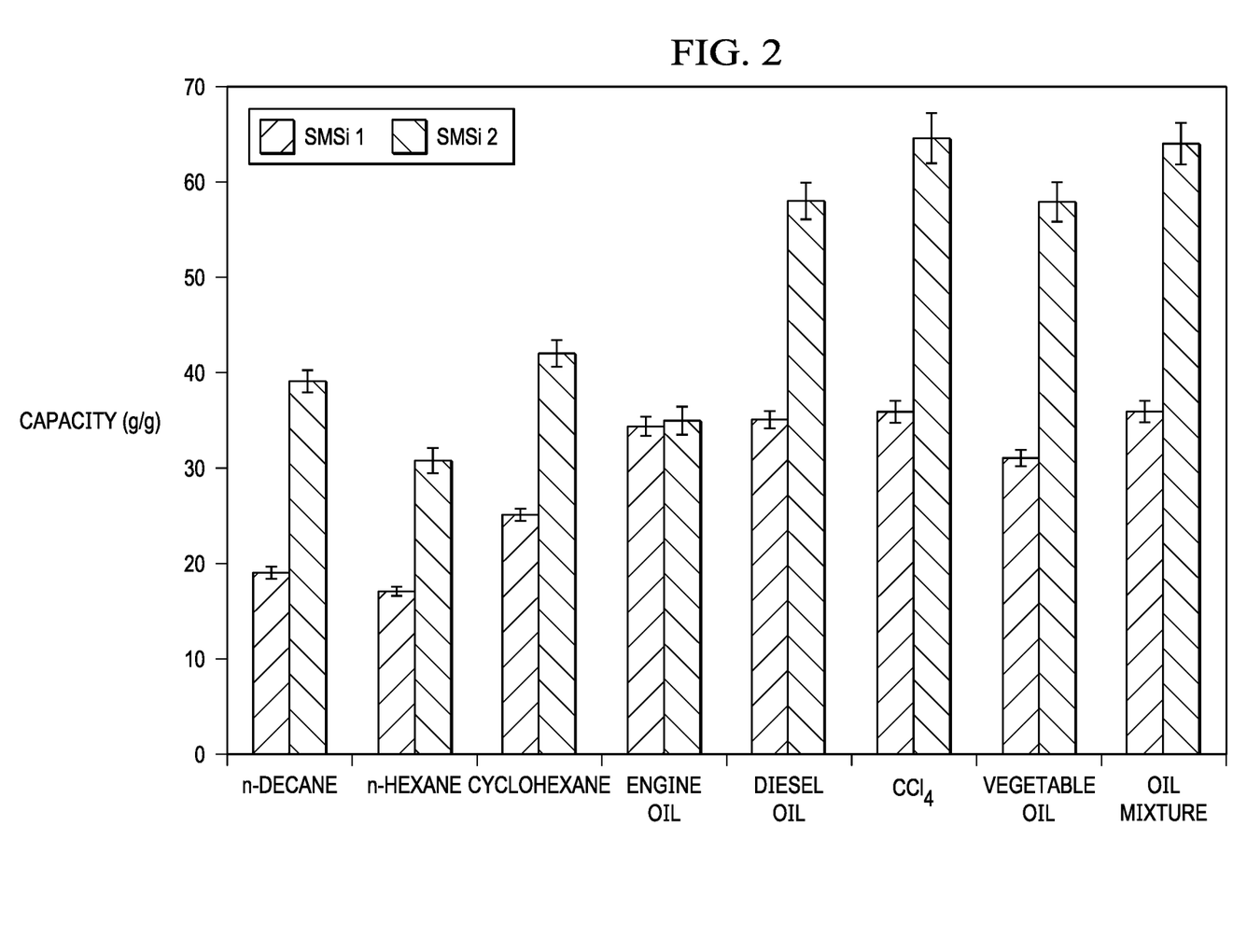
FIG. 2 is a graph of the absorption capacity of compositions as disclosed herein in various oils and organic solvents.
Figure 3:
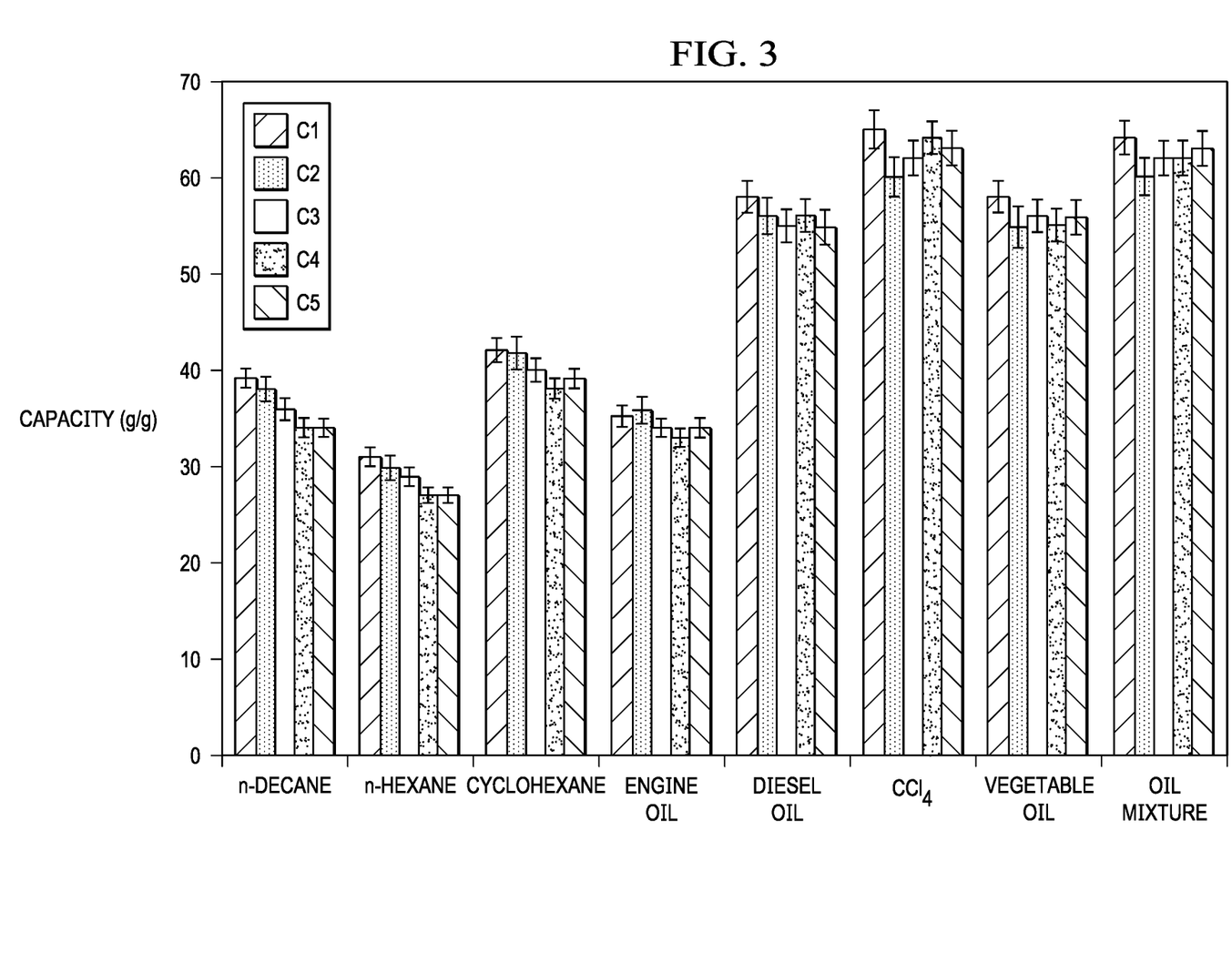
FIG. 3 is a graph of the absorption capacity of compositions as disclosed herein in various oils and organic solvents for 1 to 5 absorption-desorption cycles.

The absorption capacity of both SMSi1 and SMSi2 was evaluated using different solvents and oils as shown in FIG. 2 and FIG. 3. The maximum adsorption capacity varies depending on the viscosity and density of the organic liquids. This is a result of variations in densities and viscosities of the oils and other factors.

Absorbent reusability is another key factor for oil-spill cleanup. To evaluate the absorbent reusability of the SMSi2 membrane, absorption-desorption tests were carried out for several adsorption-desorption cycles. FIG. 3 shows the absorption capacity of the SMSi2 membrane after each of 5 absorption-desorption cycles. As shown in FIG. 3, C1 is the absorption capacity of the SMSi2 membrane after a single absorption-desorption cycle and C5 is the absorption capacity of the SMSi2 membrane after 5 absorption-desorption cycles. Advantageously, the SMSi2 membrane was shown to have a stable absorption capacity of +3% of the first absorption cycle and is sustained for at least 5 absorption-desorption cycles.

While certain embodiments have been described, the disclosure is not limited to such embodiments.

As an example, while embodiments using TEOS have been described, the disclosure is not limited to TEOS. As an example, in some embodiments, dimethoxydimethylsilane can be used.

In general, the relative amount of stearic acid (or its equivalent) and ethanol (or its equivalent) can be selected as desired. In some embodiments, the molar ratio of stearic acid (or its equivalent) to ethanol (or its equivalent) prior to adding that solution into the reaction vessel was from 1:2 to 1:6.

Other embodiments are encompassed by the claims.

What is claimed is:

1. A composition comprising a plurality of nanoparticles, wherein each of the nanoparticles comprises a compound of Formula (I):

wherein, R is a C8-C30 alkyl functional group;
n is 0, 1, 2 or 3;
m is 1, 2, 3, or 4; and,
the sum of n and m is 4.

2. The composition of claim 1, wherein R is a C15-C20 alkyl functional group.

3. The composition of claim 2, wherein R is a C17 alkyl functional group.

4. The composition of claim 1, wherein n is 3 and m is 1.

5. The composition of claim 1, wherein n is 0 and m is 4.

6. The composition of claim 1, wherein the plurality of nanoparticles has an average particle size distribution in a range of from about 50 nm to about 90 nm.

7. The composition of claim 1, wherein the plurality of nanoparticles has an average particle size distribution in a range of from about 60 nm to about 80 nm.

8. The composition of claim 1, wherein the plurality of nanoparticles has a contact angle in a range of from about 140° to about 144°.

9. The composition of claim 1, wherein the plurality of nanoparticles has a contact angle in a range of from about 154° to about 158°.

10. The composition of claim 1, wherein the composition has a separation efficiency of at least 80 wt % in an oil-water mixture, wherein the composition is provided in an amount of about 5 wt % based on the total weight of the oil-water mixture.

11. The composition of claim 1, wherein the composition has a separation efficiency of at least 90 wt % in an oil-water mixture, wherein the composition is provided in an amount of about 5 wt % based on the total weight of the oil-water mixture.

12. The composition of claim 10, wherein the oil in the oil-water mixture comprises one or more of hexane, decane, dodecane, diesel oil, carbon tetrachloride, vegetable oil, and ethanol.

13. The composition of claim 1, wherein the composition sustains an absorption capacity of about ±5% of the first absorption capacity in an oil-water mixture for at least 5 absorption-desorption cycles.

14. The composition of claim 1, further comprising a substrate, wherein the plurality of nanoparticles are contained in the substrate.

15. A method, comprising:
a) admixing a base, water, and a tetraalkoxysilane to form orthosilicic acid nanoparticles; and
b) admixing the orthosilicic acid nanoparticles and a saturated fatty acid to form a composition, thereby providing the composition comprising a plurality of nanoparticles recited in claim 1.

16. The method of claim 15, wherein the base and water have a pH in a range of from about 9.5 to about 10.5.

17. The method of claim 15, wherein the saturated fatty acid is a C8-C30 saturated fatty acid.

18. The method of claim 17, wherein the saturated fatty acid is stearic acid.

19. The method of claim 15, wherein the orthosilicic acid nanoparticles and the saturated fatty acid are in a molar ratio in a range of from about 1:1 to about 1:4.

20. A method of treating water comprising admixing the composition comprising a plurality of nanoparticles recited in claim 1 and an oil-water mixture.

* * * * *

UNITED STATES PATENT AND TRADEMARK OFFICE
CERTIFICATE OF CORRECTION

| | | |
|---|---|---|
| PATENT NO. | : 12,168,616 B2 | Page 1 of 1 |
| APPLICATION NO. | : 17/560698 | |
| DATED | : December 17, 2024 | |
| INVENTOR(S) | : Tawfik A. Saleh, Elaf A. Ahmed and Hasan Al Abdulgader | |

It is certified that error appears in the above-identified patent and that said Letters Patent is hereby corrected as shown below:

On the Title Page

Column 1, item (73) Assignees, Line 3, please replace "Minerals" with -- Minerals, Dhahran (SA) --.

Signed and Sealed this
Eleventh Day of March, 2025

Coke Morgan Stewart
*Acting Director of the United States Patent and Trademark Office*